United States Patent [19]

Mullins

[11] Patent Number: 5,666,792
[45] Date of Patent: Sep. 16, 1997

[54] REMOTELY GUIDED BRUSH CUTTING, CHIPPING AND CLEARING APPARATUS AND METHOD

[76] Inventor: Donald B. Mullins, P.O. Box 683, Simonton, Tex. 77476

[21] Appl. No.: 366,626

[22] Filed: Dec. 30, 1994

[51] Int. Cl.[6] ................................................. A01D 41/00
[52] U.S. Cl. ................................ 56/10.2 A; 56/DIG. 15; 56/10.2 F; 172/2; 172/4.5
[58] Field of Search .................... 56/10.2 A, 10.2 D, 56/102 F, 102 R, DIG. 15; 460/112, 113; 111/903, 904; 172/2, 4.5

[56] References Cited

U.S. PATENT DOCUMENTS

| 4,180,964 | 1/1980 | Pansire | 56/10.2 |
|---|---|---|---|
| 4,244,123 | 1/1981 | Lazure et al. | 37/348 |
| 4,318,266 | 3/1982 | Taube | 56/10.2 |
| 4,532,757 | 8/1985 | Tutle | 56/328 |
| 4,888,890 | 12/1989 | Studebaker et al. | 37/348 |
| 4,912,643 | 3/1990 | Beirxe | 172/4.5 X |
| 4,967,362 | 10/1990 | Schutten et al. | 364/424.07 |
| 4,978,246 | 12/1990 | Quenzi et al. | 172/4.5 X |
| 4,994,970 | 2/1991 | Noji et al. | 364/424.02 |
| 5,100,229 | 3/1992 | Lundberg et al. | 172/4.5 X |
| 5,375,663 | 12/1994 | Teach | 172/4.5 |
| 5,438,817 | 8/1995 | Nakamura | 56/10.2 A |

Primary Examiner—Terry Lee Melius
Assistant Examiner—Heather Shackelford
Attorney, Agent, or Firm—David M. O'Brian

[57] ABSTRACT

A remotely guided brush cutting, chipping and clearing apparatus, dependent upon remote positioning data and radio communication signals, having an apparatus locator system for determining the location of the apparatus and a guidance system for achieving and maintaining the desired direction of travel for the apparatus, relative to the surface of the earth and method for guiding the apparatus.

21 Claims, 5 Drawing Sheets

REMOTELY GUIDED BRUSH CUTTING, CHIPPING AND CLEARING APPARATUS AND METHOD

FIELD OF THE INVENTION

The present invention relates generally to a brush cutting, chipping and clearing apparatus and method for use. Specifically, the present invention relates to a remotely guided brush cutting, chipping and clearing apparatus, dependent upon remote positioning data, having a locator system for determining a location of the apparatus and a guidance system to achieve and maintain a desired direction of travel for the apparatus, relative to the surface of the earth and method of guiding the apparatus.

BACKGROUND OF THE INVENTION

The ability to quickly and accurately navigate through and traverse over lightly to moderately wooded and/or thicketed terrain, in the absence of permanently damaging the land, is of significant importance. Presently it is a difficult task to clear small to moderate sized brush consisting of small trees having diameters of up to 5 inches, thick briar patches, overgrown vines, grasses and weeds in an effort to accurately locate and travel a desired path. Often, the desired path may, for example, include property lines, seismic lines, rights-of-way and the like. Even where the survey coordinates, longitude and latitude coordinates or other types of location data are known for the specific property line, seismic line or right-of-way, brush and overgrown vegetation present significant barriers to physically locating these pathways. Various types of soil damaging equipment such as bulldozers, road scrapers and other types of heavy equipment may be used to push aside brush, however the soil damage incurred to the land generally outweighs the benefit of using this type of equipment. In the past, the location and clearing of property lines, seismic lines, rights-of-way and the like, in lightly to moderately wooded and/or thicketed areas has generally required a surveyor and a lead survey crew to begin at a known location and slowly and methodically hand cut its path and "step-off" the appropriate distance in the desired direction to locate property lines, seismic lines, rights-of-way and the like, while a brush clearing crew and/or a brush clearing device follow behind the surveyor. Although this procedure for identifying property lines, seismic lines, rights-of-way and the like is generally accurate, it is nonetheless, very slow, labor intensive and expensive.

It would be of great benefit to not only be able to quickly and accurately navigate through and traverse over lightly to moderately wooded and thicketed terrain, but, at the same time to be able to locate a desired direction of travel and clear a pathway through the wooded and thicketed areas to provide easy access for motorized and/or foot traffic through said pathway.

Heretofore, there have been no devices which integrate an apparatus locator system and an apparatus guidance system with a brush cutting, chipping and clearing apparatus, which provides for remote guidance of a brush cutting, chipping and clearing apparatus over property lines, seismic lines, rights-of-way and the like, while clearing a pathway for motorized and/or foot traffic, without the need for traditional survey procedures. For the apparatus locator system to be effective throughout the world, it would need to be dependent on a satellite guidance system. One apparatus locator system may include, for example, communications equipment which could receive signals from the Global Positioning System (GPS) satellite network. A detailed explanation of the Global Positioning System is set forth in U.S. Pat. No. 5,155,490, GEODETIC SURVEYING SYSTEM USING MULTIPLE GPS BASE STATIONS, issued to Spradley, Jr. et al. The GPS satellite network comprises 24 satellites which produce positioning signals and provide for the calculation of distance measurements. A minimum of three GPS satellite signals are necessary to determine any position on the earth. The GPS satellite signals can be received by one or more base stations and by a GPS antenna which may be mounted to the apparatus. The base station receives and interprets the GPS satellite signals and produces a differential correction signal, based on the GPS satellite signals received. The base station in turn sends the differential correction signal to a communication satellite which conveys the differential correction signal to a radio antenna mounted to the apparatus. The differential correction signal and the GPS satellite signals can be simultaneously interpreted by the guidance system. The location of the apparatus with respect to the earth and the desired direction of travel could both be displayed by the guidance system. An operator, stationed on board the apparatus or remotely stationed from the apparatus but having access to the guidance system, could view the guidance system and in response thereto maneuver the apparatus to cut, chip and clear small to moderately sized brush while traveling in a desired direction, i.e. over property lines, seismic lines, rights-of-way and the like. The GPS satellite signals provide very accurate guidance information where they can be received and where the positioning signal can be conveyed to the receiver antenna. However, in thickly forested areas or other areas having dense overhead or "canopy" cover, the GPS satellite signals may not always be effectively received. Thus the need arises for alternate apparatus locator systems which can be used in areas having canopy cover. An alternate apparatus locator system which may be used in areas having canopy cover may include, for example, an automated or semi-automated geodetic survey system, independent of guidance satellite signals. One such semi-automated geodetic survey system, may, for instance comprise the Geodimeter® System 4000. The Geodimeter® System 4000 is an automated survey system consisting of a transportable station unit positioned at a known point and a mobile reflector, generally mounted to a transportable carrier or vehicle. The station unit continuously conveys laser signals to the reflector, as the reflector moves away from the station unit. The laser signals are then reflected back to the station unit and measurement data is collected by a guidance system which may for example be a control unit or data processor which may be affixed adjacent to the reflector. The laser signals are processed at the station unit and a radio signal is sent to the guidance system. The radio signal is processed by and displayed by the guidance system, thus informing the operator as to the present location of the apparatus and the desired direction of travel.

Therefore, a need exists for an apparatus and a method for using a remotely guided brush cutting, chipping and clearing apparatus having a locator system for determining the location of the apparatus and a guidance system for determining the desired direction of travel for the apparatus, relative to the surface of the earth.

Although the need for such a device has been long felt, the prior art, heretofore, has not provided such a device which meets all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, an apparatus and method for remotely guiding the brush cutting, chipping and clearing apparatus, dependent upon remote positioning data and radio communication signals, is presented to quickly and accurately navigate through and traverse over lightly to moderately wooded and thicketed terrain, while at the same time clearing a pathway through the wooded and thicketed areas to provide passage for motorized and/or foot traffic through said pathway. The preferred embodiment remotely guided brush cutting, chipping and clearing apparatus preferably consists of a vehicle; a cutting head mounted to said vehicle for cutting, chipping and clearing brush; an apparatus locator system mounted to the vehicle for receiving the positioning data and radio communication signals; and a guidance system in signal communication with the apparatus locator system to process the remote positioning data and radio communication signals to determine the current location and a desired direction of travel for the apparatus. The cutting head preferably includes a plurality of pivotal, U-shaped, throw-out knives mounted to a rotatable, horizontal shaft and a drive means for rotating the horizontal shaft. The guidance system may for example be a data processor having a central processing unit for processing the remote positioning data, the radio communication signals and the survey coordinates of a desired or pre-determined direction of travel, including, for example, the survey coordinates for property lines, seismic lines, rights-of-way and the like. The guidance system may also include a video display screen for displaying to an operator the processed data, including the current position of the apparatus relative to the surface of the earth, and the desired direction of travel for the apparatus. The apparatus locator system may include, for instance, one or more satellite antennae for receiving a plurality of remote positioning data signals produced from a guidance satellite system and one or more communication antennae for receiving a differential correction signal generated from a satellite base station. The base station may, for example, be a GPS base station. The base station is preferably also in communication with the remote positioning data signals produced by the guidance satellite system. The one or more satellite antennae and the one or more communication antennae are preferably mounted to the vehicle. The guidance satellite system may include any of the public access satellite systems, such as, for example the Coast Guard satellite guidance system. The guidance satellite system may also include any commercial or private satellite systems, such as for instance, the Omni-Star satellite guidance system. The base station may, for example, be a Coast Guard operated facility or may be privately operated, wherein users pay for the differential correction signal broadcast.

Alternatively, the apparatus locator system may include communication equipment in communication with an automated or semi-automated geodetic survey system. The alternate embodiment apparatus locator system may include for example a first communication antenna mounted to the apparatus. The geodetic survey system may further include, for example, a station unit and a reflector. The reflector is typically mounted to the apparatus or some other object which generally moves away from the station unit. The station unit may transmit a continuous laser signal or other type of signal to the reflector, wherein the reflector returns the signal back to the station unit. The station unit processes the reflected laser signal and, in response thereto, produces and transmits remote positioning data in the form of a radio signal to the guidance system. The guidance system may, for instance, be a data processor or control unit having a central processing unit and a visual display, which is mounted on the apparatus. The radio signal generated from the station unit contains location and positioning information regarding the reflector which is mounted to the apparatus. The guidance system processes the radio signal, determines the location of the apparatus, displays the location of the apparatus and the desired direction of travel for the apparatus.

A method for remotely guiding a brush cutting, chipping and clearing apparatus, dependent upon remote positioning data and radio communication signals, the method preferably includes the steps of: receiving by an apparatus locator system, the remote positioning data and radio communication signals; conveying the remote positioning data and radio communication signals from the apparatus locator system to a guidance system; processing and displaying by the guidance system, the remote positioning data and radio communication signals transmitted from the apparatus locator system; interpreting, by an operator, the data processed by the guidance system to determine a current location of the apparatus with respect to the surface of the earth; and maneuvering of the apparatus by the operator, to guide the apparatus in a desired direction of travel.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

The above general description and the following detailed description are merely illustrative of the generic invention and additional modes, advantages and particulars will be readily suggested to those skilled in the art without departing from the spirit and the scope of the invention.

DETAILED DESCRIPTION OF THE INVENTION

Figure 1:
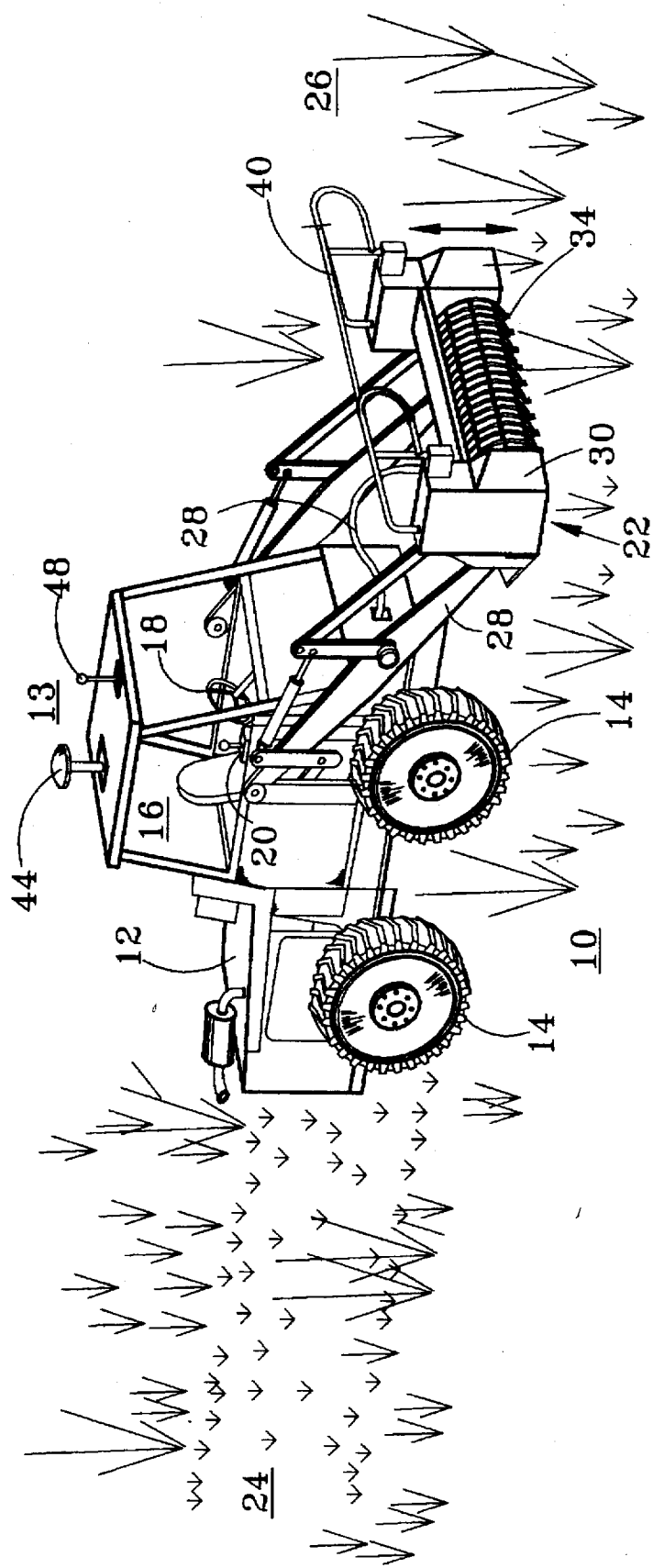
FIG. 1 is a perspective view of a remotely guided brush cutting, chipping and clearing apparatus embodying the concepts of the present invention.

With reference to the drawings wherein like parts are designated by like numerals, FIG. 1 illustrates a perspective view of a preferred embodiment remotely guided brush cutting, chipping and clearing apparatus 10, which is dependent upon remote positioning data and radio communication signals, as defined by the present invention. The remotely guided brush cutting, chipping and clearing apparatus 10 preferably includes a vehicle 12; having three or more wheels 14; a cab 16 for accommodating an operator (not shown), a steering control means 18 for controllably maneuvering the vehicle 12, a power control means 20; and a cutting or cutter head 22 mounted to the vehicle 12 for cutting, chipping and clearing a pathway 24 through an area of small to moderately sized brush 26. The cutter head 22 is mounted to the vehicle 12 via a hydraulic support system 28 which selectively raises and lowers the height of the cutter head 22. The cutter head 22 includes a housing 30 within which is secured a rotatable, horizontal shaft 32. The hydraulic support system 28 also provides rotational drive power for the horizontal shaft 32.

Figure 2A:
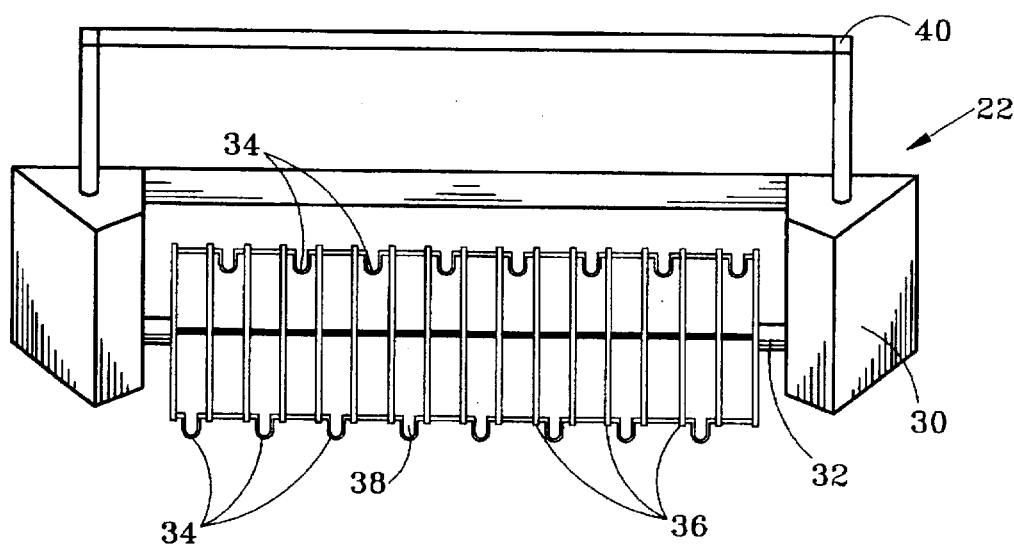
FIG. 2A is a front view of a preferred embodiment cutting head of the present invention shown in FIG. 1.
Figure 2B:
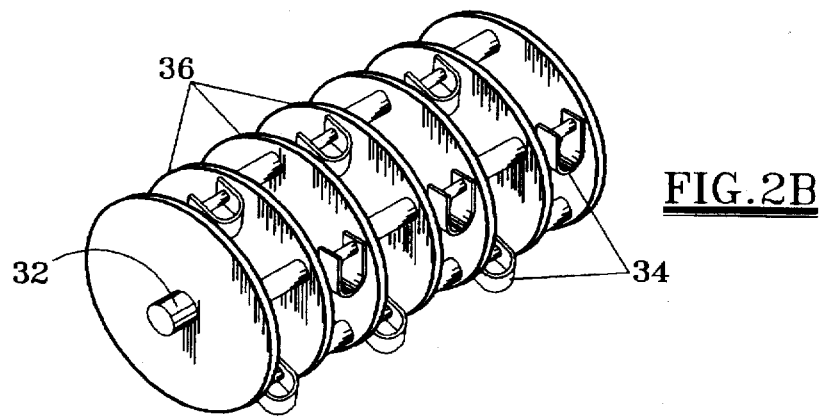
FIG. 2B is a partial cut-away, perspective view of the cutting head shown in FIG. 2A.

With reference to FIGS. 1, 2A and 2B, a plurality of U-shaped throw-out knives 34 are shown mounted to a peripheral edge of a plurality of mounting discs 36. The mounting discs 36 are laterally mounted on and rotated by the rotatable, horizontal shaft 32. The plurality of throw-out knives 34 are pivotally affixed to a plurality of mounting discs 36 such that when the shaft 32 is rotated at high revolutions per minute, such as, for example, 60 rpm, the throw-out knives 34 pivot outward from the mounting discs 36 to extend a "trough" portion 38 having a very sharp edge, wherein the sharp edged trough portions 38 cut, chip and clear the brush 26. Additionally, the preferred embodiment cutter head 22 includes one or more bumpers 40 which facilitate the feeding of small to medium sized brush 26 into the cutter head 22 and the bumpers 40 also serve to protect the cutting head 22 from unintentional contact with non-brush related material (not shown).

Figure 3:
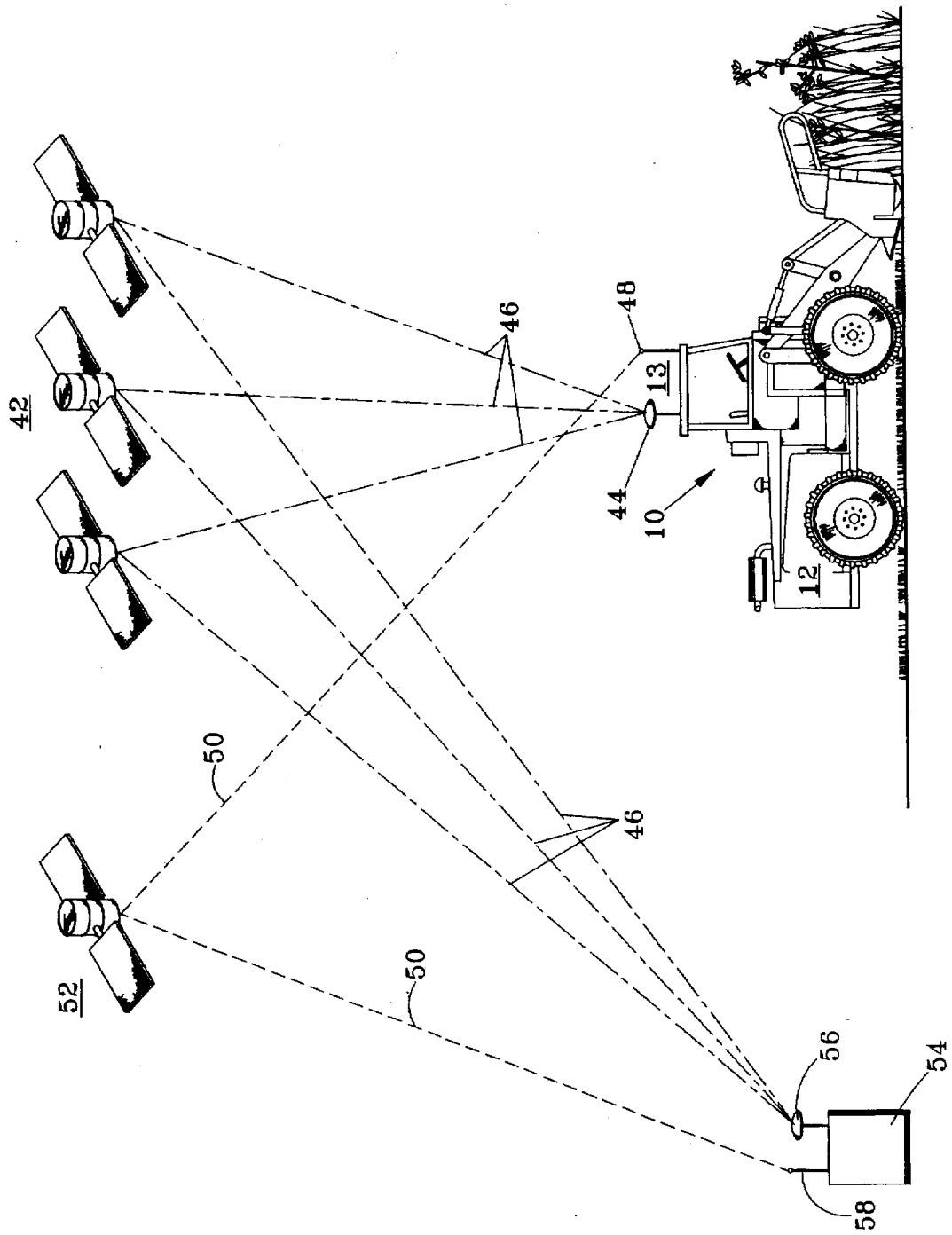
FIG. 3 is a pictorial representation illustrating the operation of the preferred embodiment of the present invention as shown in FIG. 1.

Referring now to FIG. 3, a pictorial representation illustrating the operation of a preferred embodiment of the present invention utilizing a guidance satellite network 42 is depicted. The satellite network 42 used in the preferred embodiment remotely guided, brush, cutting, chipping and clearing apparatus 10 may, for example, be the Global Positioning System (GPS) Network, consisting of 24 positioning satellites 42. In the preferred embodiment remotely guided, brush, cutting, chipping and clearing apparatus 10, the vehicle 12 has mounted thereto an apparatus locator system 13 which includes a first satellite receiver antenna 44 for receiving a plurality of satellite network signals 46, sometimes referred to as "tracking" or remote positioning signals 46 and a second radio communication antenna 48 for receiving a differential correction signal 50 transmitted from a communication satellite 52. A single base station 54 preferably receives a plurality of satellite network signals 46 at a second satellite receiver antenna 56. The satellite network signals 46 are received and processed at the base station 54 wherein a differential correction signal 50 is produced. The differential correction signal 50 is transmitted from a second radio antenna 58, located at the base station 54 to the communication satellite 52 for transmission to the first radio antenna 48.

Figure 5:
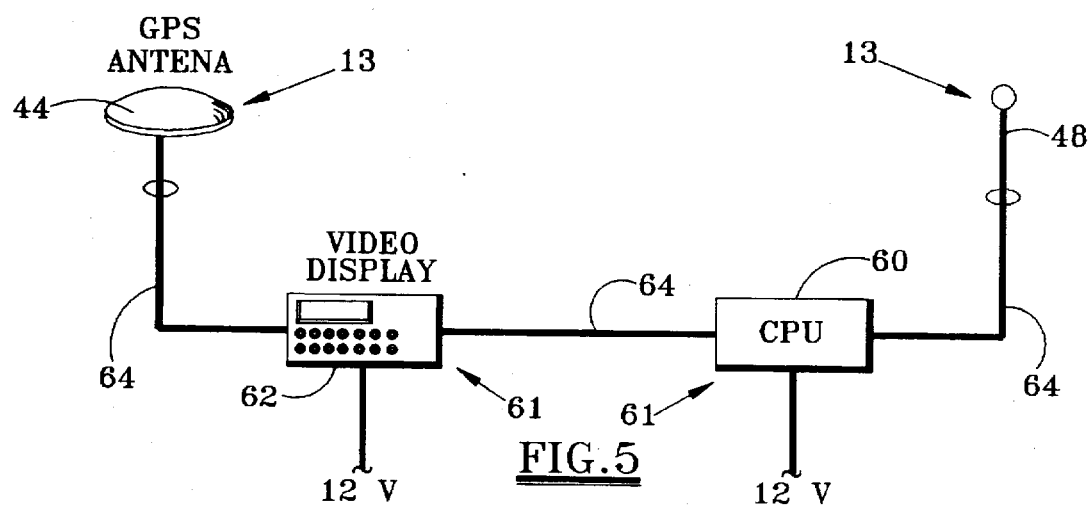
FIG. 5 is a schematic diagram illustrating the operation and relationship between the first satellite antenna, the preferred embodiment guidance system and the second communication antenna of the present invention.
Figure 4:
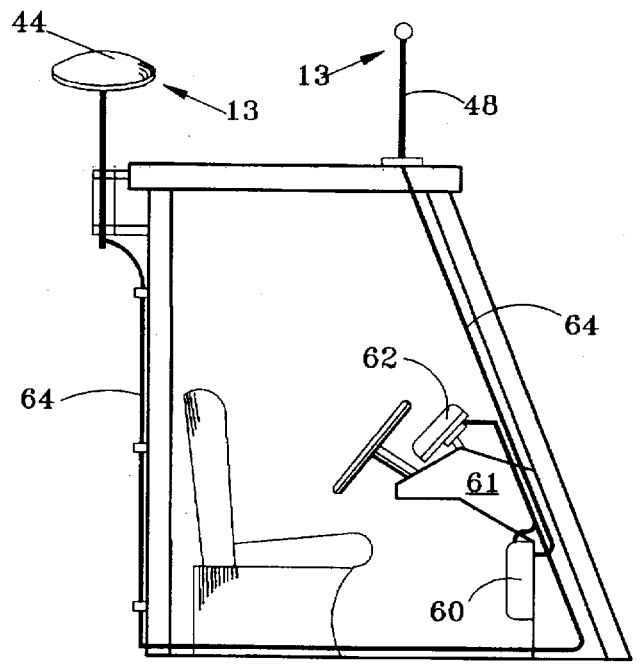
FIG. 4 is detailed side view of a cab interior of the preferred embodiment of the present invention, illustrating the placement of the guidance system.

Referring now to FIGS. 3-5 the differential correction signal 50 which is received by the first communication antenna 48 is conveyed to a guidance system 61 mounted to the vehicle 12. The guidance system 61 may, for example, include a data processor 60 and a video display 62. A quantity of data (not shown), including survey coordinates, longitude and latitude coordinates or other survey information describing the desired direction of travel, including property lines, seismic lines, rights-of-way and the like, is preferably input into the data processor 60 and can be viewed on the video display 62. In the preferred embodiment, the data processor 60 may be an on-board central processing unit or personal computer, powered by the DC electrical system of the vehicle 12 (not shown). The first satellite receiver antenna 44 receives the satellite network signals 46 and conveys the signals 46 to the video display 62. The video display 62 may also preferably be powered by the DC electrical system of the vehicle 12 (not shown). The video display 62 then conveys the satellite network signals 46 to the data processor 60, wherein the satellite network signals 46 are corrected using the differential correction signal 50. The data processor 60 then transmits the corrected network signals 46 back to the video display 62, wherein the location of the vehicle 12, relative to the surface of the earth, is displayed on the video display 62 and, additionally the desired direction of travel of the vehicle 12 relative to the survey coordinates of the property line, seismic line, right-of-way and the like, may also be displayed on the video display 62. The satellite network signals 46 and the differential correction signal 50 are preferably communicated over a length of coaxial cable 64 disposed between and engaging the first satellite antenna 44 and the first communication antenna 48 to the guidance system 61. The operator (not shown) can view the video display 62 to determine the location of the vehicle 12 and can simultaneously make steering corrections, via the steering means 18, to maneuver the vehicle 12 to achieve and maintain the desired direction of travel. In this manner, the vehicle 12 is remotely guided using the satellite network signals 46 and the differential correction signal 50 to precisely travel in a desired direction, easily locating intangible boundaries and paths such as property lines, seismic lines, rights-of-way and the like while cutting, chipping and clearing brush, in the absence of using slow, labor intensive and expensive traditional surveying methods and in the absence of creating permanent environmental and soil erosion concerns.

The above described guidance satellite system 42 yields extremely accurate remote positioning data where the satellite network signals 46 can be received by the satellite receiver antennae 44, 56 and where the differential correction signal 50 can be relayed to the first communication antenna 48. However, in areas where the satellite network signals 46 can not be received, such as for example in areas where there is a thick vegetation "canopy," i.e. swamps, jungles and thick forests, an alternative apparatus locator system must be employed to remotely guide the brush cutting, chipping and clearing apparatus 10.

Figure 6:
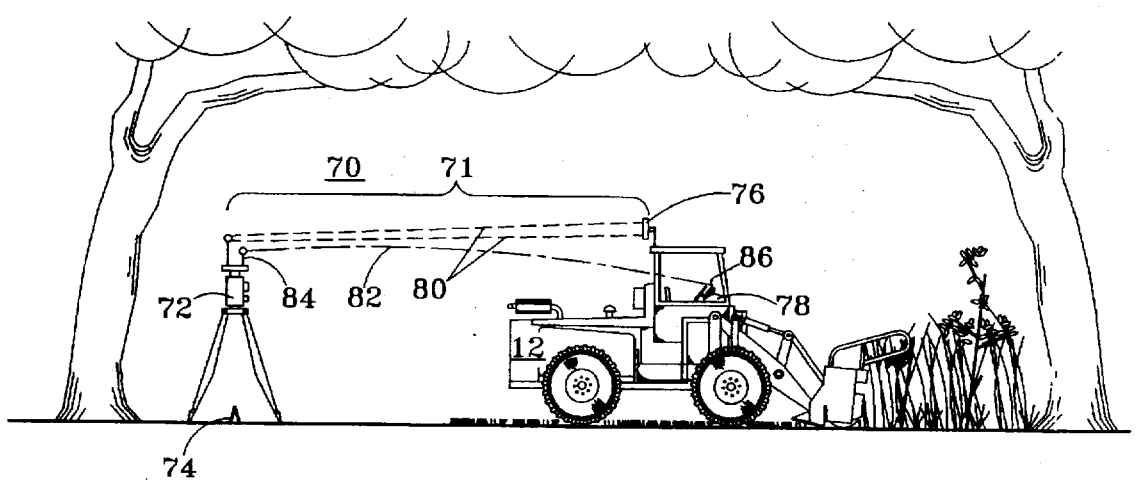
FIG. 6 is a pictorial representation illustrating the operation of an alternate embodiment of the present invention utilizing a geodetic survey apparatus locator system.

With reference now to FIG. 6, an alternate embodiment apparatus locator system 70 for remotely guiding an apparatus 10, dependent upon remote positioning data and radio communication signals, for cutting, chipping and clearing brush is depicted. The alternate embodiment apparatus locator system 70, may for example be a semi-automated geodetic survey system 71. The semi-automated geodetic survey system 71 may, for example, may be a Geodimeter® System 4000. The preferred embodiment semi-automated survey system 71, preferably consists of a transportable station unit 72, positioned at a known point 74 and a mobile reflector 76, preferably mounted to the apparatus 10. A guidance system 78, having an internal data processor, a video display and a first radio antenna (not shown) is also mounted to the apparatus 10 and is in signal communication with the station unit 72. The station unit 72 continuously conveys a laser signal 80 to the reflector 76. The laser signal 80 is then reflected back to the station unit 72 and measurement data is obtained from the reflected laser signal 80 and is collected at the station unit 72. The guidance system 78, may preferably be affixed directly to the reflector 76 or may be mounted adjacent to the reflector 76. The reflector 76 may be affixed to a movable object such as the apparatus 10 or a hand held rod (not shown). The laser signal 80 is processed at the station unit 72, wherein a radio signal 82, containing the measurement information is created. The radio signal 82 is broadcast from a first radio antenna 84 to a second radio antenna 86 which is in communication with the guidance system 78. The radio signal 82 is processed by the guidance system 78, wherein the apparatus 10 location and the desired direction of travel is visually displayed by the guidance system 78 (not shown) thus informing the operator (not shown) as to the location of the apparatus 10 with respect to the surface of the earth and illustrating the desired direction of travel.

Figure 7:
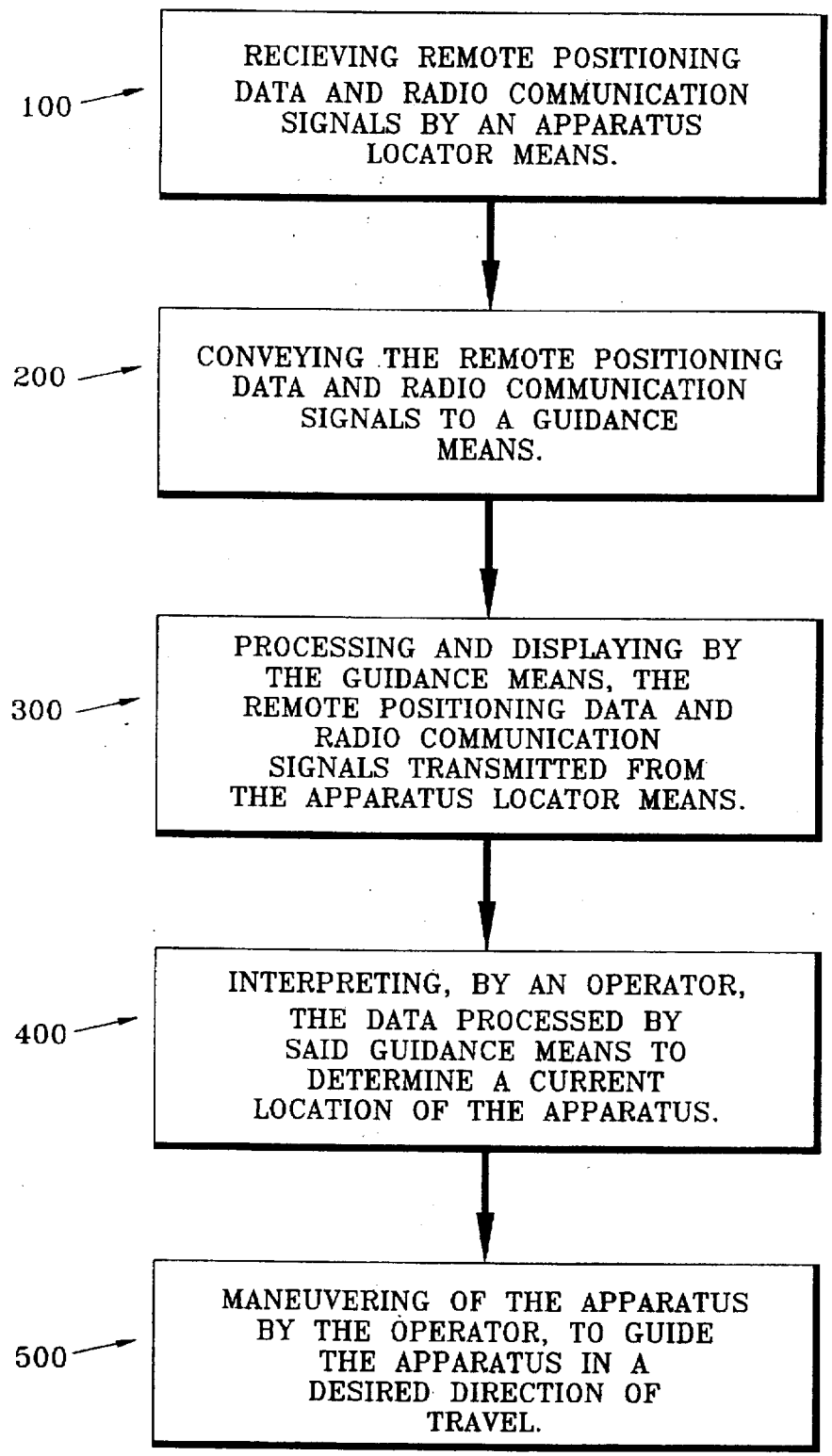
FIG. 7 is a block diagram depicting a preferred method of remotely guiding a brush cutting, chipping and clearing apparatus.

With reference to FIG. 7, a block diagram depicting a preferred method for using the remotely guided brush cutting, chipping and clearing apparatus 10, dependent upon remote positioning data and radio communication signals, having an apparatus locator system 13, 70 for determining the location of the apparatus 10 and the desired direction of travel for the apparatus 10, relative to the surface of the earth is presented. The method preferably includes the steps of: receiving 100 by an apparatus locator system 13, 70, the remote positioning data 46, 80 and radio communication signals 50; conveying 200 the remote positioning data 46, 80 and radio communication signals 50 to a guidance system 61, 78; processing and displaying 300 by the guidance system 61, 78 the remote positioning data 46, 80 and radio communication signals 50 transmitted from the apparatus locator system 13, 70; interpreting 400, by an operator (not shown), the data processed by the guidance system 61, 78 to determine a current location of the apparatus 10 with respect to the surface of the earth; and maneuvering 500 the apparatus 10, by the operator, to guide the apparatus 10 in a desired direction of travel.

It will appreciated that these and other embodiments may be provided to remotely guide a brush cutting, chipping and clearing apparatus, dependent upon remote positioning data and radio communication signals, having an apparatus locator means for determining the location of the apparatus and a guidance means for displaying the desired direction of travel for the apparatus, relative to the surface of the earth. Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. A remotely guided brush cutting, chipping and clearing apparatus, dependent upon remote positioning data and radio communication signals, comprising:

a wheeled vehicle;

a hydraulic support system and a rotational power supply mounted to said vehicle;

a cutting head for cutting, chipping and clearing brush and trees, said cutting head being mounted to said hydraulic support system and engaged to said rotational power supply;

an apparatus locator means mounted to said vehicle for receiving the remote positioning data and the radio communication signals; and a guidance means in signal communication with said apparatus locator means, for continuously reading and processing the remote positioning data and the radio communication signals to determine an instantaneous location of the vehicle relative to the surface of the earth and, in response thereto, to guide the vehicle for movement in a desired direction and to assist the vehicle in maintaining travel in the desired direction and returning the vehicle to the desired direction.

2. The remotely guided brush cutting, chipping and clearing apparatus, dependent upon remote positioning data and radio communication signals, as defined in claim 1, wherein the cutting head includes a housing, within which is secured a rotatable horizontal shaft engaged to said rotational power supply, and having a plurality of mounting discs laterally mounted to the horizontal shaft, a plurality of pivotal, U-shaped, throw-out knives mounted to the mounting discs and at least one bumper mounted to the housing to facilitate the cutting, chipping and clearing of brush and trees.

3. The remotely guided brush cutting, chipping and clearing apparatus, dependent upon remote positioning data and radio communication signals, as defined in claim 2, wherein said cutting head is vertically adjustable.

4. The remotely guided brush cutting, chipping and clearing apparatus, dependent upon remote positioning data and radio communication signals, as defined in claim 1, wherein said apparatus locator means comprises at least one first antenna for receiving the remote positioning data and at least one second antenna for receiving the radio communication signals.

5. The remotely guided brush cutting, chipping and clearing apparatus, dependent upon remote positioning data and radio communication signals, as defined in claim 1, wherein the guidance means comprises a data processor mounted to said vehicle to continuously process the remote positioning data and radio communication signals for providing navigational guidance, to guide the apparatus for movement in the desired direction.

6. The remotely guided brush cutting, chipping and clearing apparatus, dependent upon remote positioning data and radio communication signals, as defined in claim 5, wherein the data processor further comprises a central processing unit for continuously processing the remote positioning data and radio communication signals and a display means for visually conveying the remote positioning data and the desired direction to an operator.

7. The remotely guided brush cutting, chipping and clearing apparatus, dependent upon remote positioning data and radio communication signals as defined in claim 1, wherein the remote positioning data comprises a plurality of GPS network signals.

8. The remotely guided brush cutting, chipping and clearing apparatus, dependent upon remote positioning data and radio communication signals as defined in claim 7, wherein the radio communication signals comprise a plurality of differential correction signals generated from at least one GPS base station.

9. The remotely guided brush cutting, chipping and clearing apparatus, dependent upon remote positioning data and radio communication signals as defined in claim 8, wherein the apparatus locator means comprises a first GPS antenna mounted to the vehicle for receiving the plurality of GPS network signals and a second radio communication antenna for receiving the plurality of differential correction signals.

10. The remotely guided brush cutting, chipping and clearing apparatus, dependent upon remote positioning data and radio communication signals, as defined in claim 6, wherein the display means is a video display screen for displaying a current position of the vehicle relative to the surface of the earth and the desired direction of travel for the vehicle.

11. The remotely guided brush cutting, chipping and clearing apparatus, dependent upon remote positioning data and radio communication signals, as defined in claim 1, wherein said apparatus locator means comprises a first radio communication antenna mounted to the vehicle for receiving the remote positioning data transmitted by a geodetic survey system.

12. The remotely guided brush cutting, chipping and clearing apparatus, dependent upon remote positioning data and radio communication signals, as defined in claim 11, wherein said apparatus guidance means comprises a data processor mounted to said vehicle and is in signal communication with said first radio communication antenna for receiving the remote positioning data and radio communication signals.

13. The remotely guided brush cutting, chipping and clearing apparatus, dependent upon remote positioning data and radio communication signals, as defined in claim 12, wherein said data processor comprises a central processing unit to continuously process the remote positioning data and radio communication signals and a video display screen to display a current position of the apparatus relative to the surface of the earth and the desired direction of travel for the apparatus, to guide the apparatus for movement in the desired direction and to assist the vehicle in maintaining travel in the desired direction and returning the vehicle to the desired direction.

14. A remotely guided brush cutting, chipping and clearing apparatus, dependent upon remote positioning data and radio communication signals, comprising:

a wheeled vehicle;

a hydraulic support system and a rotational power supply mounted to said vehicle;

a vertically adjustable cutting head mounted to said hydraulic support system and said rotational power supply for cutting, chipping and clearing brush and trees, wherein the cutting head includes a housing, within which is secured a rotatable horizontal shaft engaged to said rotational power supply, and having a plurality of mounting discs laterally mounted to the horizontal shaft, a plurality of U-shaped, throw-out knives pivotally mounted on the mounting discs and at least one bumper mounted on the housing to facilitate the cutting, chipping and clearing of brush and trees;

at least one first antenna mounted to said vehicle for receiving the remote positioning data and at least one second antenna mounted to said vehicle for receiving the radio communication signals; and a data processor means mounted to said vehicle, in signal communication with said at least one first antenna and said at least one second antenna for continuous processing of the remote positioning data and the radio signal communications for determining and displaying a current position of said vehicle, relative to the surface of the earth and also displaying the desired direction of travel for the vehicle and in response thereto, to guide the vehicle in the desired direction and to assist the vehicle in maintaining travel in the desired direction and returning the vehicle to the desired direction.

15. A method of remotely guiding a brush cutting, chipping and clearing apparatus, dependent upon remote positioning data and radio communication signals, comprising the steps of:

receiving by an apparatus locator means, the remote positioning data and radio communication signals;

conveying the remote positioning data and radio communication signals from said apparatus locator means to a guidance means;

inputting into the guidance means, a desired direction of travel as a function of location;

continuously processing and displaying by the guidance means, the desired direction of travel, and the remote positioning data and the radio communication signals transmitted from said apparatus locator means;

instantaneously comparing by the guidance means, the present location of the vehicle to the desired direction of travel;

interpreting, by an operator, the data processed by the guidance means; and maneuvering of the vehicle through input to the guidance means by the operator based on the interpreter data to guide the vehicle in a desired direction of travel and to maneuver the vehicle in maintaining travel in the desired direction and returning the vehicle to the desired direction of travel.

16. The remotely guided brush cutting, chipping and clearing apparatus, dependent upon remote positioning data and radio communication signals, as defined in claim 2, wherein the throw-out knives, at revolutions of at least 60 revolutions per minute, outwardly extend a sharpened U-shaped cutting edge to cut, chip and clear trees and brush.

17. The remotely guided brush cutting, chipping and clearing apparatus, dependent upon remote positioning data and radio communication signals, as defined in claim 14, wherein the throw-out knives, at revolutions of at least 60 revolutions per minute, outwardly extend a sharpened U-shaped cutting edge to cut, chip and clear trees and brush.

18. The remotely guided brush cutting, chipping and clearing apparatus, dependent upon remote positioning data and radio communication signals, as defined in claim 14, further comprising an apparatus locator means including said at least one first antenna for receiving the remote positioning data and said at least one second antenna for receiving the radio communication signals.

19. The remotely guided brush cutting, chipping and clearing apparatus, dependent upon remote positioning data and radio communication signals, as defined in claim 14, wherein the data processor further comprises a central processing unit for continuously processing the remote positioning data and radio communication signals and a display means for visually conveying the remote positioning data and the desired direction to an operator.

20. The remotely guided brush cutting, chipping and clearing apparatus, dependent upon remote positioning data and radio communication signals, as defined in claim 14, wherein the remote positioning data comprises a plurality of GPS network signals.

21. The remotely guided brush cutting, chipping and clearing apparatus, dependent upon remote positioning data and radio communication signals, as defined in claim 19, wherein the display means is a video display screen for displaying a current position of the vehicle relative to the surface of the earth and the desired direction of travel for the vehicle.

* * * * *